US011048412B1

United States Patent
Furo et al.

(10) Patent No.: US 11,048,412 B1
(45) Date of Patent: Jun. 29, 2021

(54) STORAGE SYSTEM AND INFORMATION PROCESSING METHOD BY STORAGE SYSTEM

(71) Applicant: Hitachi, Ltd., Tokyo (JP)

(72) Inventors: Takayuki Furo, Tokyo (JP); Shinya Takeuchi, Tokyo (JP); Hiroshi Hayakawa, Tokyo (JP); Akira Shirasu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/005,956

(22) Filed: Aug. 28, 2020

(30) Foreign Application Priority Data

Apr. 23, 2020 (JP) .............................. JP2020-076909

(51) Int. Cl.
| | | |
|---|---|---|
| *G06F 3/06* | (2006.01) | |
| *G06F 8/71* | (2018.01) | |
| *H04L 29/08* | (2006.01) | |
| *G06F 11/34* | (2006.01) | |
| *G06F 11/30* | (2006.01) | |

(52) U.S. Cl.
CPC ............ *G06F 3/0607* (2013.01); *G06F 3/067* (2013.01); *G06F 3/0629* (2013.01); *G06F 8/71* (2013.01); *G06F 11/3055* (2013.01); *G06F 11/3409* (2013.01); *H04L 67/34* (2013.01)

(58) Field of Classification Search
CPC .... G06F 3/0607; G06F 11/3409; G06F 3/067; G06F 11/3055
See application file for complete search history.

(56) References Cited

U.S. PATENT DOCUMENTS

| | | | | |
|---|---|---|---|---|
| 2007/0294662 | A1* | 12/2007 | Kim ....................... | B25J 9/1661 717/107 |
| 2008/0301763 | A1* | 12/2008 | Sasaki ................. | G06F 11/3485 726/1 |
| 2009/0064348 | A1* | 3/2009 | Bang ................... | G06Q 30/0239 726/33 |
| 2010/0251232 | A1* | 9/2010 | Shinomiya ......... | H04N 1/00973 717/177 |
| 2012/0030503 | A1* | 2/2012 | Li .......................... | G06F 11/203 714/4.11 |
| 2017/0329599 | A1* | 11/2017 | Choi ......................... | G06F 8/61 |
| 2018/0034897 | A1* | 2/2018 | Moriyama .............. | H04L 67/02 |

FOREIGN PATENT DOCUMENTS

JP          2016-173636 A      9/2016

\* cited by examiner

*Primary Examiner* — Getente A Yimer (74) *Attorney, Agent, or Firm* — Mattingly & Malur, PC (57) ABSTRACT

To automate processing of agent software which operates in a storage apparatus. A storage system includes: a storage apparatus including a storage device which stores data and one or two or more pieces of agent software, and a controller for controlling the agent software; and a server that transmits and receives information to and from the storage apparatus via a network, wherein the controller: activates the agent software and monitors a status of the agent software; and causes the agent software to execute processing on condition that the status of the agent software is standby.

8 Claims, 9 Drawing Sheets

| NAME | SERIAL NUMBER | VOLUME CAPACITY | POOL CAPACITY | IOPS | CPU UTILIZATION RATE | VERSION |
|---|---|---|---|---|---|---|
| volume1 | 1000 | 100 | 500 | 1.1 | 0.1 | 5.1.1 |
| volume2 | 1001 | 200 | 600 | 0.8 | 0.3 | 12.0.8 |
| volume3 | 1002 | 300 | 700 | 2.2 | 0.2 | 4.9.22 |
| ⋮ | ⋮ | ⋮ | ⋮ | ⋮ | ⋮ | ⋮ |

FIG.2B

| STATUS | USER ID | COMMAND CODE |
|---|---|---|
| normal | User_Own | add ldev |
| error | User_Chi | delete ldev |
| ⋮ | ⋮ | ⋮ |

STORAGE SYSTEM AND INFORMATION PROCESSING METHOD BY STORAGE SYSTEM

CROSS-REFERENCE TO RELATED APPLICATION

The present application claims priority from Japanese application JP2020-076909, filed on Apr. 23, 2020, the contents of which is hereby incorporated by reference into this application.

TECHNICAL FIELD

The present invention relates to a storage system in which a storage apparatus and a server on cloud are coupled to each other via a network, and an information processing method by the storage system.

BACKGROUND ART

There is a storage system in which a plurality of user terminals and a storage apparatus in a data center are coupled to each other via a network, data from each user terminal is stored in the storage apparatus, and the data in the storage apparatus are controlled in an integrated manner and managed by a server on cloud via the network. This storage system adopts a configuration such that storage apparatus management software is incorporated into the server on the cloud, agent software for managing the storage apparatus in accordance with instructions from the storage apparatus management software is incorporated into the storage apparatus, and information is transmitted and received between the storage apparatus management software and the agent software via the network. Under this circumstance, it is necessary to update the storage apparatus management software and the agent software as necessary in order to continuously enhance the quality of services.

Regarding a method for updating a plurality of apparatuses, for example, when both firmware for a first apparatus and firmware for a second apparatus are to be updated, there is proposed a technique that executes setting processing for setting updated firmware to the first apparatus and the second apparatus and then executes switching processing, after termination of the setting processing, for making the updated firmware, which has been set to each of the first apparatus and the second apparatus, serve as operating firmware (see PTL 1).

CITATION LIST

Patent Literature

PTL 1: Japanese Patent Application Laid-Open (Kokai) Publication No. 2016-173636

SUMMARY OF THE INVENTION

Problems to be Solved by the Invention

With the conventional storage system, a user updates the agent software and the user manually downloads and installs the agent software. Accordingly, when the agent software which executes processing for collecting configuration information, performance information, and capacity information of the storage apparatus and processing for transmitting the collected information as metric information to the server executes update processing, the server cannot acquire the configuration information, the performance information, and the capacity information of the storage apparatus from the storage apparatus while the agent software is being updated. Also, part of the metric information transmitted from the storage apparatus to the server may sometimes get lost. Specifically speaking, the conventional storage system is not be sufficient enough to satisfy the user's requirements as described as follows, for example, "(1) it should be a storage system having a simple management interface which can be easily handled by an infrastructure administrator; and (2) it should be a storage system which can be applied to a cloud native usage form, that is, a storage system which can be used anytime from anywhere, whose initial cost is low, and which can always update the software to the latest version."

It is an object of the present invention to automate the processing of the agent software which operates in the storage apparatus.

Means to Solve the Problems

In order to solve the above-described problem, an aspect of the present invention includes: a storage apparatus that includes a storage device which stores data and one or two or more pieces of agent software, and a controller for controlling the agent software; and a server that transmits/sends information to/from the storage apparatus via a network, wherein the controller activates the agent software, monitors a status of the agent software, and causes the agent software to execute processing on condition that the status of the agent software is standby.

Advantageous Effects of the Invention

The processing of the agent software which operates in the storage apparatus can be automated according to the present invention.

DESCRIPTION OF EMBODIMENTS

Embodiments will be explained below with reference to the drawings.

Figure 1:
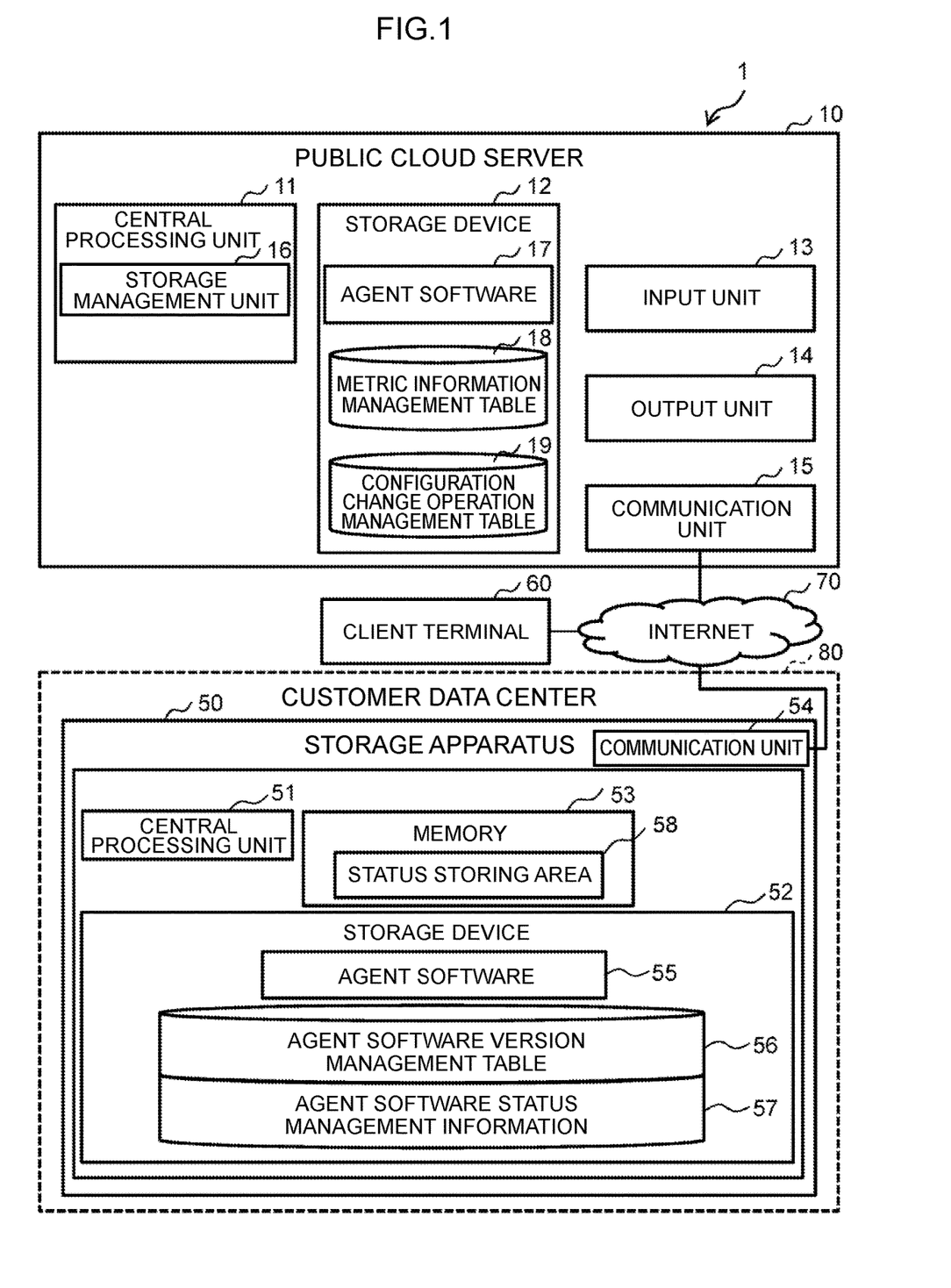
FIG. 1 is an overall configuration diagram of a storage system according to this embodiment.

FIG. 1 is an overall configuration diagram of a storage system according to this embodiment. Referring to FIG. 1, a storage system 1 includes a public cloud server 10, a storage apparatus 50, one or two or more client terminals 60, and the Internet 70; and the public cloud server 10, the storage apparatus 50, and each client terminal 60 are coupled to each other via a communication network such as the Internet 70.

The public cloud server 10 is configured of a computer device including a central processing unit 11, a storage device 12, an input unit 13, an output unit 14, and a communication unit 15. The central processing unit 11 has a processor for controlling operations of the entire apparatus in an integrated manner; and the processor is equipped with functions as a storage management unit 16 that cuts out volumes stored in the storage apparatus 50 and manages information of the volumes. The storage device 12 is composed of storage media such as a RAM (Random Access Memory) and a ROM (Read Only Memory). The storage device 12 stores, as software resources, information of agent software 17, a metric information management table 18, and a configuration change operation management table 19. The input unit 13 is composed of, for example, a keyboard or a mouse. The output unit 14 is composed of, for example, a display or a printer. The communication unit 15 is configured by including a communication interface for connecting to, for example, the Internet 70.

The storage apparatus 50 is configured of a computer device (computer) including a central processing unit 51, a storage device 52, a memory 53, and a communication unit 54 and is located at one or two or more customer data centers 80.

The central processing unit 51 functions as a controller for controlling operations of the entire apparatus in an integrated manner. Under this circumstance, the controller generates metric information including configuration information, performance information, and capacity information of the storage apparatus 50 on the basis of information recorded in the storage device 52 and records the generated metric information in the storage device 52. The storage device 52 is configured of storage devices (storage media), such as hard disk devices, semiconductor memory devices, optical disk devices, magneto-optic disk devices, magnetic tape devices, or flexible disk devices, which store software resources such as data and tables. The respective storage devices can constitute a RAID (Redundant Array of Inexpensive Disks) group such as RAID4 or RAID5 and the respective storage devices can be divided into a plurality of RAID groups. Under this circumstance, a plurality of logical units or a plurality of logical volumes can be also formed in physical storage areas of each storage device.

Furthermore, the storage device 52 stores, as software resources, one or two or more pieces of agent software 55, one or two or more agent software version management tables 56, and agent software status management information 57. The two or more pieces of agent software 55 are composed of the agent software 55 of mutually different versions. Each agent software 55 whose processing is controlled by the central processing unit 51 is activated by the central processing unit 51, is read to the memory 53, and executes various kinds of processing in a state of being decompressed in the memory 53. For example, each agent software 55 executes any one of the following processing without any overlap: configuration change processing on the storage apparatus 50; processing for acquiring the metric information, which is recorded in the storage device 52, from the storage device 52 and notifying the public cloud server 10 of the acquired metric information; and update processing on the agent software 55. The memory 53 is composed of storage media such as a RAM and a ROM. A status storing area 58 which stores the status of the agent software 55 is formed in the memory 53. The communication unit 54 is configured by including a communication interface for connecting to, for example, the Internet 70.

Each client terminal 60 is a user terminal operated by each user and is configured of a computer device including a CPU (Central Processing Unit), an input device, an output device, a communication device, and a storage device.

Figure 2A:
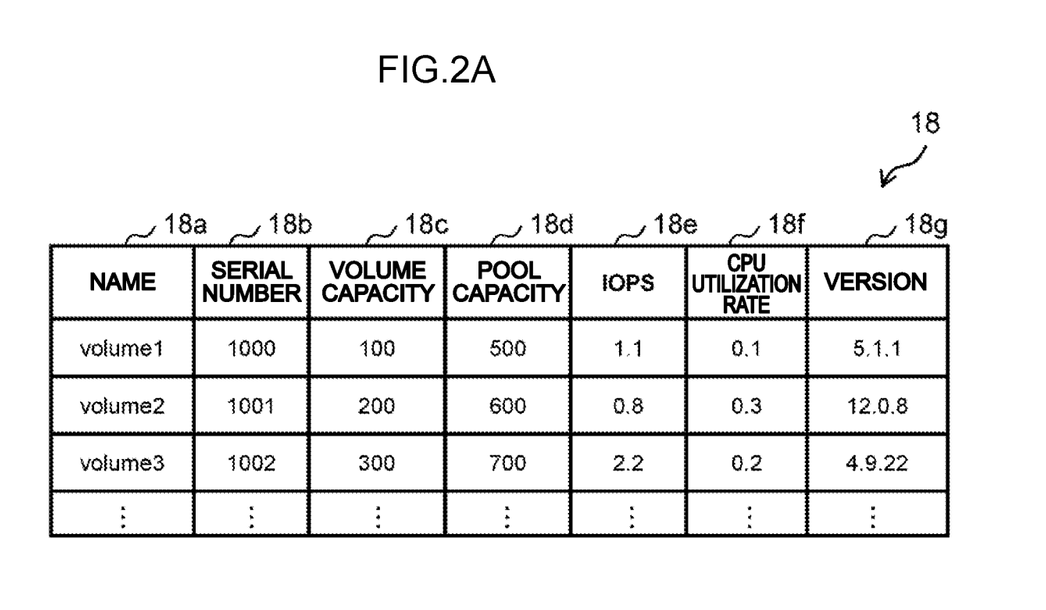
FIG. 2A is a configuration diagram of a metric information management table according to the embodiment.

FIG. 2A is a configuration diagram of a metric information management table according to the embodiment. Referring to FIG. 2A, the metric information management table 18 is a table stored in the storage device 12 for the public cloud server 10 and is composed of a name 18a, a serial number 18b, a volume capacity 18c, a pool capacity 18d, an IOPS 18e, a CPU utilization rate 18f, and a version 18g. The metric information management table 18 stores the metric information including the configuration information, the performance information, and the capacity information of the storage apparatus 50.

Specifically speaking, the name 18a stores information about a volume name for uniquely identifying the relevant volume configured in the storage device 52 for the storage apparatus 50. The serial number 18b stores information about a serial number of the relevant volume configured in the storage device 52 for the storage apparatus 50. The volume capacity 18c stores information about the capacity of the relevant volume configured in the storage device 52 for the storage apparatus 50. The pool capacity 18d stores information about the capacity of the relevant pool configured in the storage device 52 for the storage apparatus 50. The IOPS (Input Output Per Second) 18e stores information about the number of times data can be read or written per second. The CPU utilization rate 18f stores information about a utilization rate of the CPU which is the central processing unit 51 for the storage apparatus 50. The version 18g stores information about a version of the relevant firmware for the storage apparatus 50.

Figure 2B:
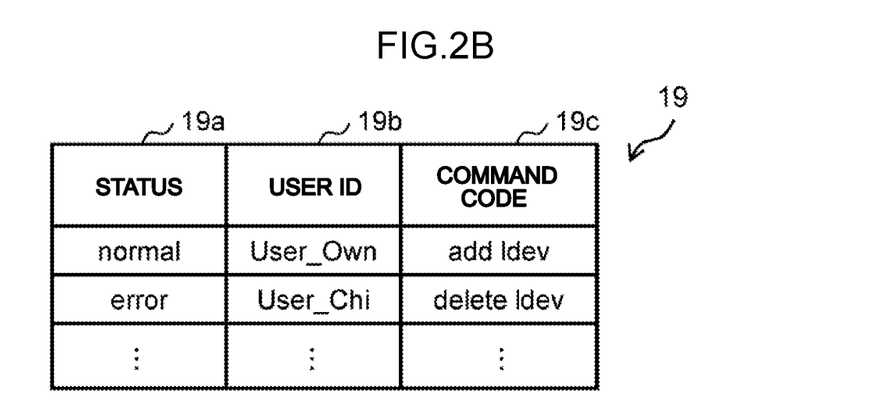
FIG. 2B is a configuration diagram of a configuration change operation management table according to the embodiment.

FIG. 2B is a configuration diagram of a configuration change operation management table according to the embodiment. Referring to FIG. 2B, the configuration change operation management table 19 is a table stored in the storage device 12 for the public cloud server 10 and is composed of a status 19a, a user ID 19b, and a command code 19c. The configuration change operation management table 19 stores the configuration change information for the agent software to execute the configuration change processing.

The status 19a stores information about the status indicating whether the storage apparatus 50 is normal or not. The user ID 19b stores information about the ID of a user who performed the relevant configuration change operation. The command code 19c stores information about the relevant command code when the configuration change operation was executed. For example, if a volume (logical volume) is added by the configuration change operation, the command code 19c stores information of "addldev."

Figure 3A:
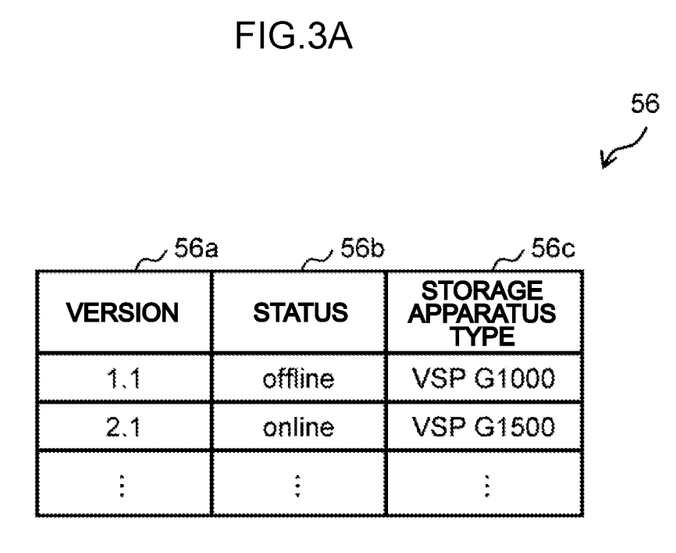
FIG. 3A is a configuration diagram of an agent software version management table according to the embodiment.

FIG. 3A is a configuration diagram of an agent software version management table according to the embodiment. Referring to FIG. 3A, the agent software version management table 56 is a table stored in the storage device 52 for the storage apparatus 50 and is composed of a version 56a, a status 56b, and a storage apparatus type 56c.

The version 56a stores information about a version of the agent software 55. The status 56b stores information indicating whether the agent software 55 is active (online) or not. The storage apparatus type 56c stores information about a type of the storage apparatus 50 which manages the agent software 55.

Figure 3B:
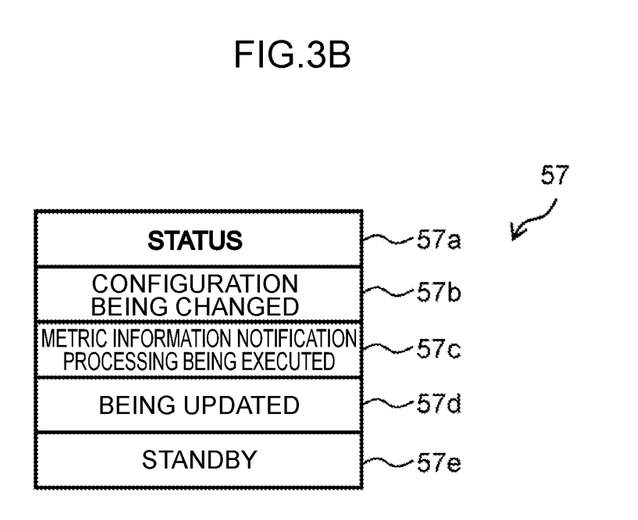
FIG. 3B is a configuration diagram of agent software status management information according to the embodiment.

FIG. 3B is a configuration diagram of agent software status management information according to the embodiment. Referring to FIG. 3B, the agent software status management information 57 is information stored (recorded) in the status storing area 58 of the memory 53 for the storage apparatus 50 and includes a status 57a.

The status 57a is information indicating the status of processing of the agent software 55 activated by the central processing unit 51 and is composed of the following information: "configuration being changed 57b" which means that the configuration change processing is being executed; "metric information notification processing being executed 57c" which means that the processing for notifying the public cloud server 10 of the metric information is being executed; "being updated 57d" which means that the agent software 55 is being updated; and "standby 57e" which means standby. Any one of the information in the status 57a is selected by the central processing unit 51 according to the status of the processing of the agent software 55 and the one piece of selected information is stored in the status storing area 58.

When activating the agent software 55, the central processing unit 51: monitors the status of the agent software 55 by, for example, monitoring the status of the agent software 55 along with the elapse of time; and sequentially records the status of the agent software 55 in the status storing area 58 of the memory 53. Under this circumstance, on condition that the status of the agent software 55 (the information recorded in the status storing area 58 of the memory 53) is "standby 57e," the central processing unit 51 causes the agent software 55 to execute any one of the following processing: the processing for changing the configuration of the storage apparatus 50 on the basis of the configuration change information received from the public cloud server 10; the processing for notifying the public cloud server 10 of the metric information; and the processing for updating the agent software 55 on the basis of the update information received from the public cloud server 10.

Figure 4:
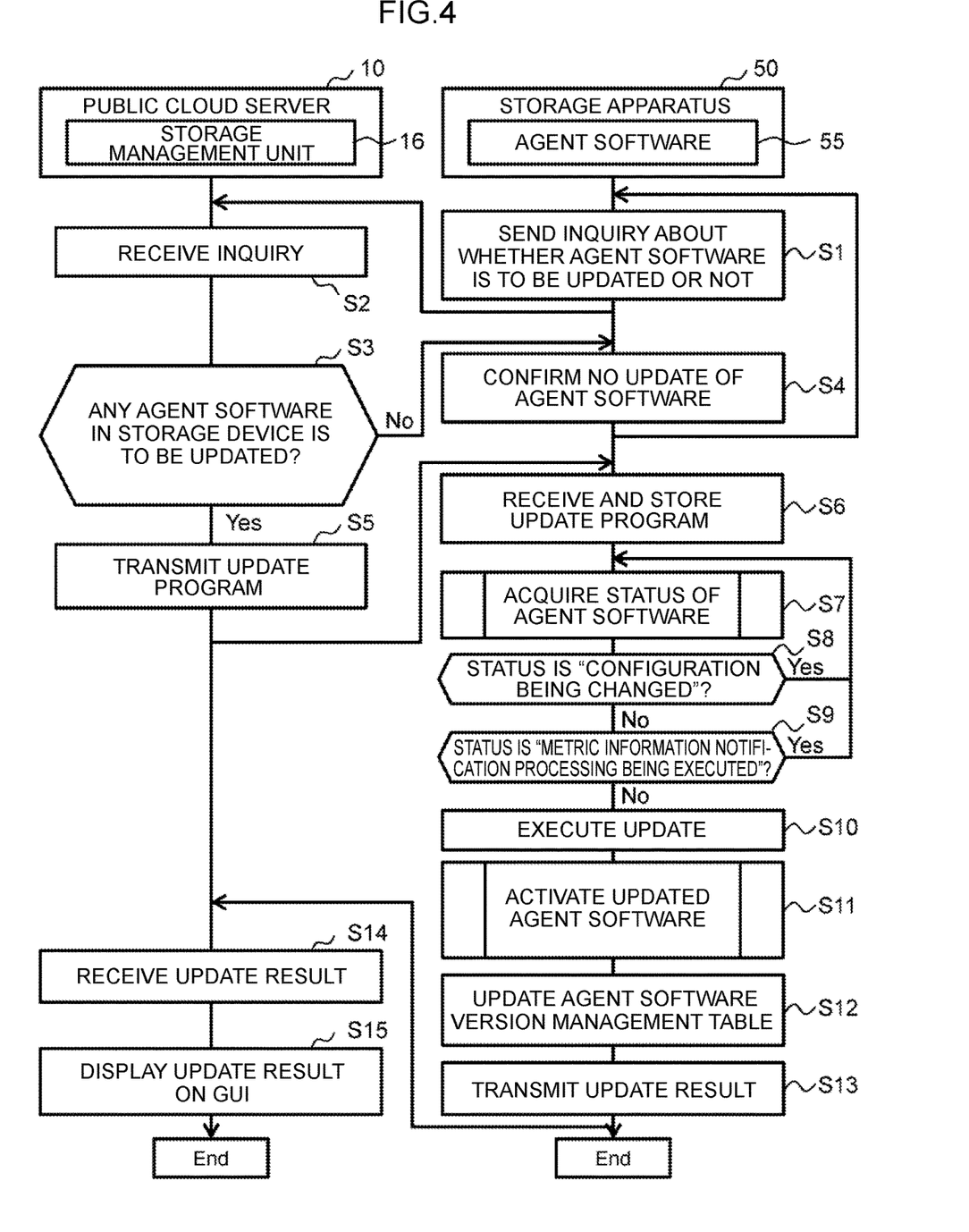
FIG. 4 is a flowchart for explaining agent software update processing according to the embodiment.

FIG. 4 is a flowchart for explaining agent software update processing according to the embodiment. This processing is regularly executed between the public cloud server 10 and the storage apparatus 50 via the Internet 70.

Referring to FIG. 4, when the processing is started at the storage apparatus 50 which manages the agent software 55, the central processing unit 51 activates the agent software 55. The agent software 55 activated by the central processing unit 51 regularly transmits an inquiry to check whether there is any update of the agent software 55 or not to the public cloud server 10 via the communication unit 54 and the Internet 70 (S1). The public cloud server 10 regularly receives the inquiry from the storage apparatus 50 (S2). When the public cloud server 10 receives the inquiry from the storage apparatus 50, the storage management unit 16 for the public cloud server 10 judges whether there is any update of the agent software 17 corresponding to the agent software 55 in the storage device 12 or not (S3). In other words, the storage management unit 16 judges whether or not there is any agent software 17 which should be updated in the storage device 12.

If a negative judgment result is obtained in step S3 and there is no update of the agent software 17 corresponding to the agent software 55 in the storage device 12, that is, if there is no agent software 17 to be updated, the storage management unit 16 transmits information indicating that there is no update of the agent software 17 to the storage apparatus 50 via the communication unit 15 and the Internet 70. When the storage apparatus 50 receives this information, the agent software 55 activated by the central processing unit 51: confirms the information indicating that there is no update of the agent software 55 (S4); and then returns to the processing in step S1.

On the other hand, if an affirmative judgment result is obtained in step S3 and there is an update of the agent software 17 corresponding to the agent software 55 in the storage device 12, that is, if there is any updated agent software 17, the storage management unit 16 transmits an update program, which is the updated agent software 17, to the storage apparatus 50 via the communication unit 15 and the Internet 70 (S5). When the storage apparatus 50 receives this update program, the agent software 55 activated by the central processing unit 51 stores the received update program in the storage device 52 (S6) and then proceeds to processing in step S7.

The agent software 55 activated by the central processing unit 51: refers to the memory 53 and acquires the status of the agent software 55 from the status storing area 58 in step S7; and then judges whether or not the status of the agent software 55 is the configuration being changed (S8). If the agent software 55 activated by the central processing unit 51 obtains an affirmative judgment result in step S8, that is, if the status of the agent software 55 is the configuration being changed, the agent software 55 returns to the processing in step S7 and repeats the processing in steps S7 and S8; and if the agent software 55 obtains a negative judgment result in step S8, that is, if the status of the agent software 55 is not the configuration being changed, the agent software 55 judges whether or not the status of the agent software 55 is the metric information notification processing being executed (S9).

If the agent software 55 activated by the central processing unit 51 obtains an affirmative judgment result in step S9, that is, if the status of the agent software 55 is the metric information notification processing being executed, the agent software 55 returns to the processing in step S7 and repeats the processing in steps S7 to S9; and if the agent software 55 obtains a negative judgment result in step S9, that is, if the status of the agent software 55 is not the metric information notification processing being executed, the agent software 55 executes the update with the received update program (update information) (S10) and then proceeds to processing in step S11.

The agent software 55 activated by the central processing unit 51: activates the agent software 55, which was updated in step S10, in step S11; then updates the agent software version management table 56 on the basis of the content updated in step S10 (S12); transmits the result of the update in step S10 (update result) to the public cloud server 10 via the communication unit 54 and the Internet 70 (S13); and then terminates the processing in this routine.

When the public cloud server 10 receives the update result from the storage apparatus 50 (S14), the storage management unit 16 for the public cloud server 10 displays the received update result on a GUI (Graphical User Interface) (S15) and then terminates the processing in this routine.

Figure 5:
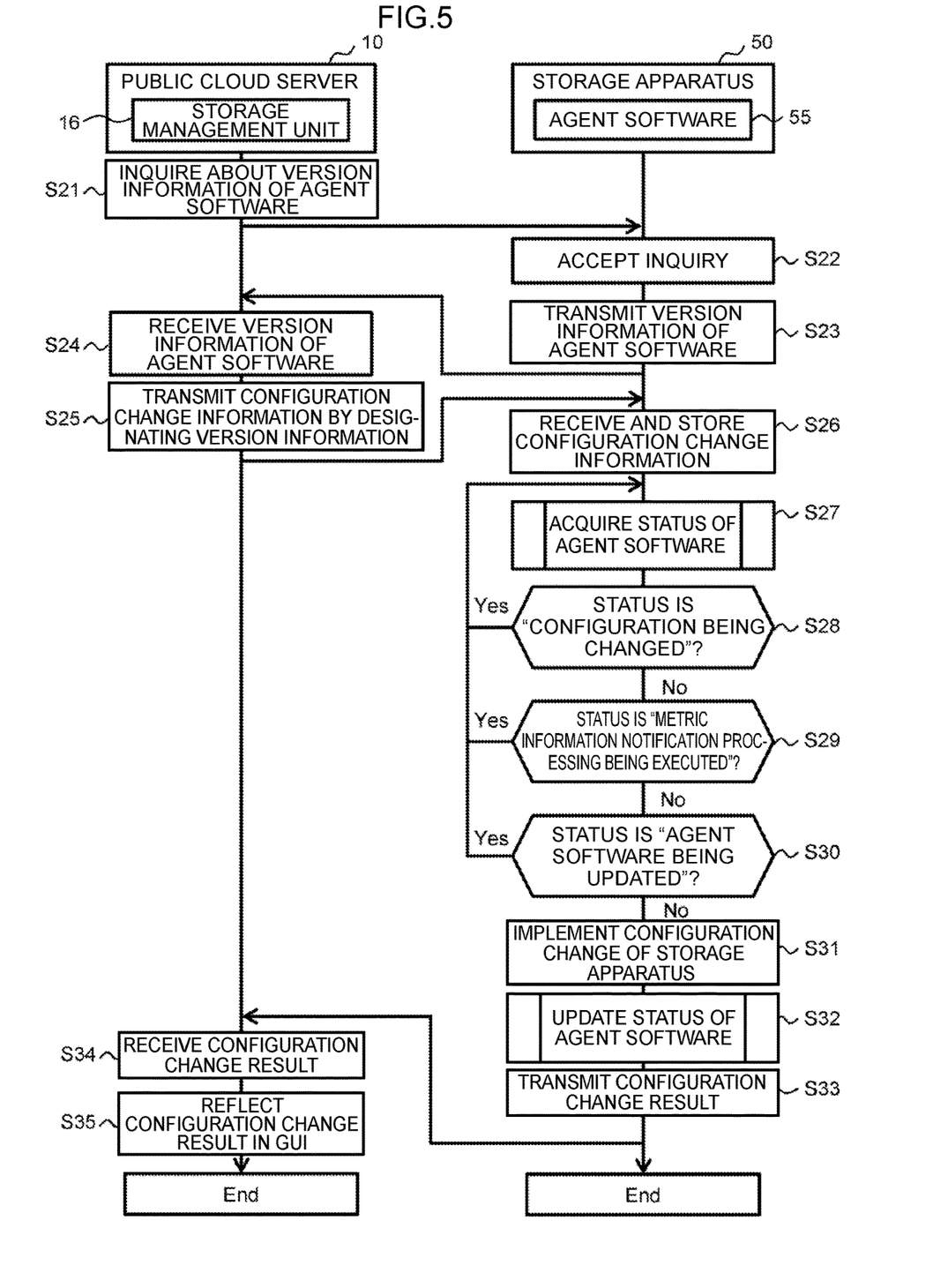
FIG. 5 is a flowchart for explaining configuration change processing according to the embodiment.

FIG. 5 is a flowchart for explaining the configuration change processing according to the embodiment. This processing is executed between the public cloud server 10 and the storage apparatus 50 via the Internet 70.

Referring to FIG. 5, for example, when the processing is started by the public cloud server 10 which manages the storage management unit 16 on condition that the user of the client terminal 60 executes the configuration change operation, the storage management unit 16 transmits an inquiry to check whether there is version information of the agent software 17 to the storage apparatus 50 via the communication unit 15 and the Internet 70 (S21). When the central processing unit 51 for the storage apparatus 50 activates the agent software 55 and the activated agent software 55 accepts the inquiry from the storage management unit 16 (S22), the agent software 55 transmits the version information about, for example, the latest version from among a plurality of versions to the public cloud server 10 via the communication unit 54 and the Internet 70 (S23).

When the public cloud server 10 receives the version information of the agent software 55 from the storage apparatus 50 (S24), the storage management unit 16 for the public cloud server 10 transmits the configuration change information (for example, information about an addition of a volume) to the storage apparatus 50 via the communication unit 15 and the Internet 70 by designating the version information including the version of the agent software 55 used for the configuration change (S25). When the storage apparatus 50 receives the configuration change information, the agent software 55 activated by the central processing unit 51 stores the received configuration change information in the storage device 52 (S26) and proceeds to processing in step S27.

The agent software 55: refers to the memory 53 and acquires the status of the agent software 55 from the status storing area 58 in step S27 (S27); and then judges whether or not the status of the agent software 55 is the configuration being changed (S28). If the agent software 55 obtains an affirmative judgment result in step S28, that is, if the status of the agent software 55 is the configuration being changed, the agent software 55 returns to the processing in step S27 and repeats the processing in steps S27 and S28; and if the agent software 55 obtains a negative judgment result in step S28, that is, if the status of the agent software 55 is not the configuration being changed, the agent software 55 judges whether or not the status of the agent software 55 is the metric information notification processing being executed (S29).

If the agent software 55 activated by the central processing unit 51 obtains an affirmative judgment result in step S29, that is, if the status of the agent software 55 is the metric information notification processing being executed, the agent software 55 returns to the processing in step S27 and repeats the processing in steps S27 to S29; and if the agent software 55 obtains a negative judgment result in step S29, that is, if the status of the agent software 55 is not the metric information notification processing being executed, the agent software 55 judges whether or not the status of the agent software 55 is the agent software 55 being updated (S30).

If the agent software 55 activated by the central processing unit 51 obtains an affirmative judgment result in step S30, that is, if the status of the agent software 55 is the agent software 55 being updated, the agent software 55 returns to the processing in step S27 and repeats the processing in steps S27 to S30; and if the agent software 55 obtains a negative judgment result in step S30, that is, if the status of the agent software 55 is not the agent software 55 being updated, the agent software 55 makes a configuration change (for example, an addition or deletion of a volume) to the storage apparatus 50 (S31) and then proceeds to processing in step S32.

The agent software 55 activated by the central processing unit 51: refers to the memory 53 and updates the status of the agent software 55 to "standby" in step S32 (S32); transmits the configuration change result, which is the content of the configuration change in step S31, to the public cloud server 10 via the communication unit 54 and the Internet 70 (S33); and then terminates the processing in this routine. Incidentally, on condition that the agent software 55 refers to the memory 53 and the status of the agent software 55 is standby in step S31, the agent software 55 can make the configuration change to the storage apparatus 50.

When the public cloud server 10 receives the configuration change result from the storage apparatus 50 (S34), the storage management unit 16 for the public cloud server 10 reflects the received configuration change result in the GUI (S35) and then terminates the processing in this routine.

Incidentally, if a single (one-type) agent software 55 is used as the agent software 55 to execute the configuration change processing, the processing in step S30 can be omitted.

Figure 6:
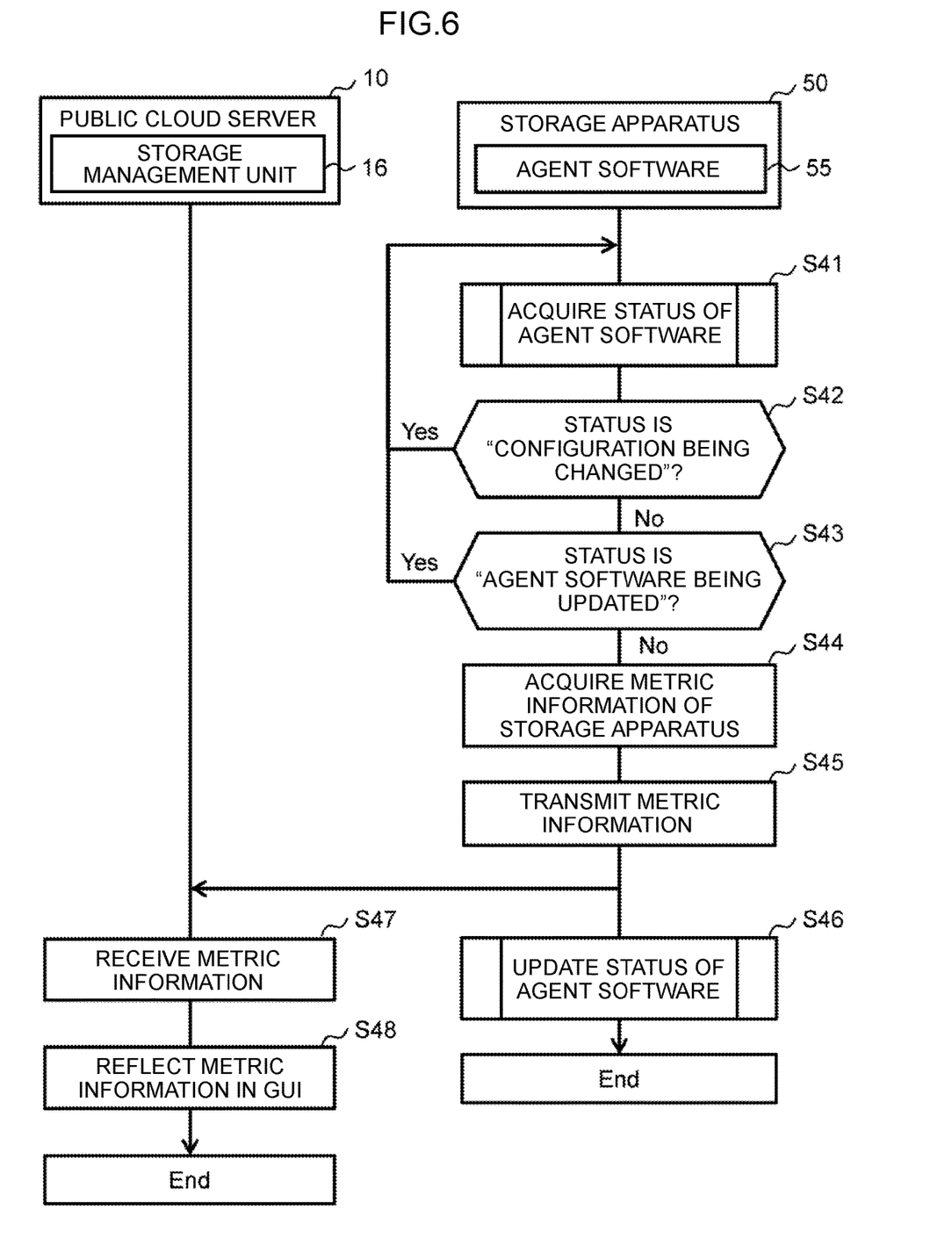
FIG. 6 is a flowchart for explaining metric information notification processing according to the embodiment.

FIG. 6 is a flowchart for explaining the metric information notification processing according to the embodiment. This processing is regularly executed between the public cloud server 10 and the storage apparatus 50 via the Internet 70.

Referring to FIG. 6, when the processing is started by the storage apparatus 50 which manages the agent software 55, the central processing unit 51 activates the agent software 55. The agent software 55 activated by the central processing unit 51: refers to the status storing area 58 of the memory 53 and acquires the status of the agent software 55 (S41); and then judges whether or not the status of the agent software 55 is the configuration being changed (S42). If the agent software 55 activated by the central processing unit 51 obtains an affirmative judgment result in step S42, that is, if the status of the agent software 55 is the configuration being changed, the agent software 55 returns to the processing in step 41 and repeats the processing in steps S41 and S42; and if the agent software 55 obtains a negative judgment result in step S42, that is, if the status of the agent software 55 is not the configuration being changed, the agent software 55 judges whether or not the status of the agent software 55 is the agent software 55 being updated (S43).

If the agent software 55 activated by the central processing unit 51 obtains an affirmative judgment result in step S43, that is, if the status of the agent software 55 is the agent software 55 being updated, the agent software 55 returns to the processing in step S41 and repeats the processing in steps S41 to S43; and if the agent software 55 obtains a negative judgment result in step S43, that is, if the status of the agent software 55 is not the agent software 55 being updated, the agent software 55: acquires the metric information of the storage apparatus 50 (information including the configuration information, the performance information, and the capacity information of the storage apparatus 50) from the storage device 52 (S44); then transmits the acquired metric information to the public cloud server 10 via the communication unit 54 and the Internet 70 (S45); and proceeds to processing in step S46.

In step S46, the agent software 55 activated by the central processing unit 51 refers to the status storing area 58 of the memory 53, updates the status of the agent software 55 to "standby," and then terminates the processing in this routine.

On the other hand, when the public cloud server 10 receives the metric information from the storage apparatus 50 (S47), the storage management unit 16 for the public cloud server 10 reflects the received metric information in the GUI (S48) and then terminates the processing in this routine.

Incidentally, if a single (one-type) agent software 55 is used as the agent software 55 to execute the metric information notification processing, the processing in step S43 can be omitted.

Figure 7A:
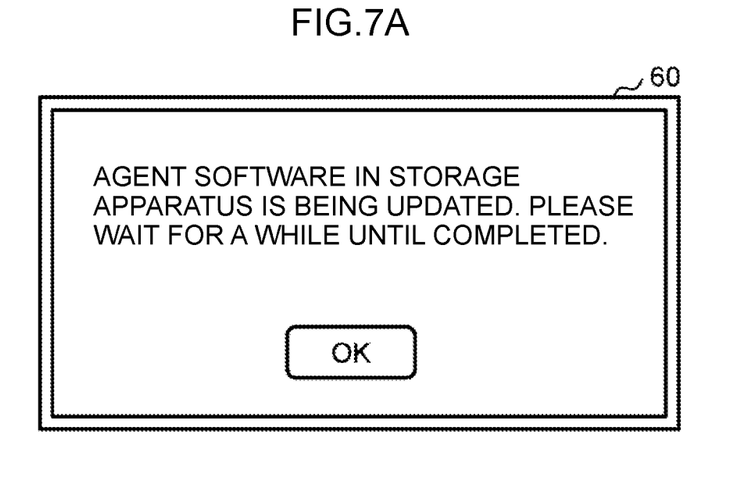
FIG. 7A and FIG. 7B are first configuration diagrams of image information processed by a public cloud server according to the embodiment.
Figure 7B:
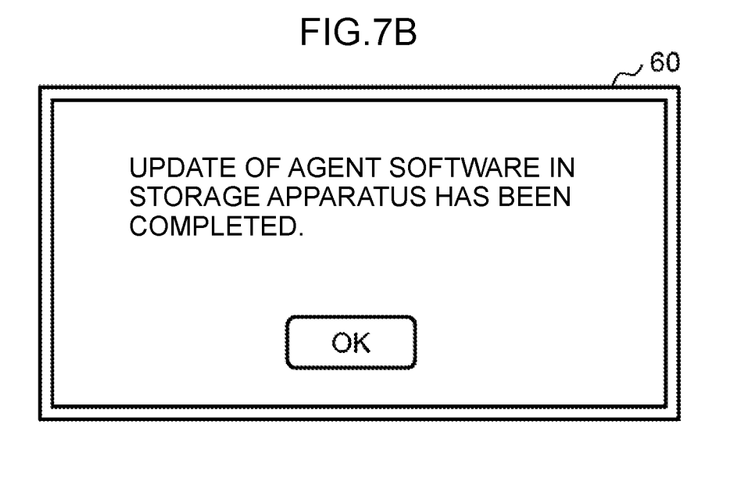

FIG. 7A and FIG. 7B are first configuration diagrams of image information processed by the public cloud server according to the embodiment. If the agent software 55 which is managed by the storage apparatus 50 is being updated, the storage management unit 16 for the public cloud server 10: generates image information indicating that "AGENT SOFTWARE IN STORAGE APPARATUS IS BEING UPDATED; PLEASE WAIT FOR A WHILE UNTIL COMPLETED"; and transmits the generated image information to the client terminal 60 via the communication unit 15 and the Internet 70. Consequently, the information indicating that "AGENT SOFTWARE IN STORAGE APPARATUS IS BEING UPDATED; PLEASE WAIT FOR A WHILE UNTIL COMPLETED" is displayed on a display screen of the client terminal 60 as illustrated in FIG. 7A.

Subsequently, when the update of the agent software 55 managed by the storage apparatus 50 is completed, the storage management unit 16: generates image information indicating that "UPDATE OF AGENT SOFTWARE IN STORAGE APPARATUS HAS BEEN COMPLETED"; and transmits the generated image information to the client terminal 60 via the communication unit 15 and the Internet 70. Consequently, the information indicating that "UPDATE OF AGENT SOFTWARE IN STORAGE APPARATUS HAS BEEN COMPLETED" is displayed on the display screen of the client terminal 60 as illustrated in FIG. 7B.

Figure 8A:
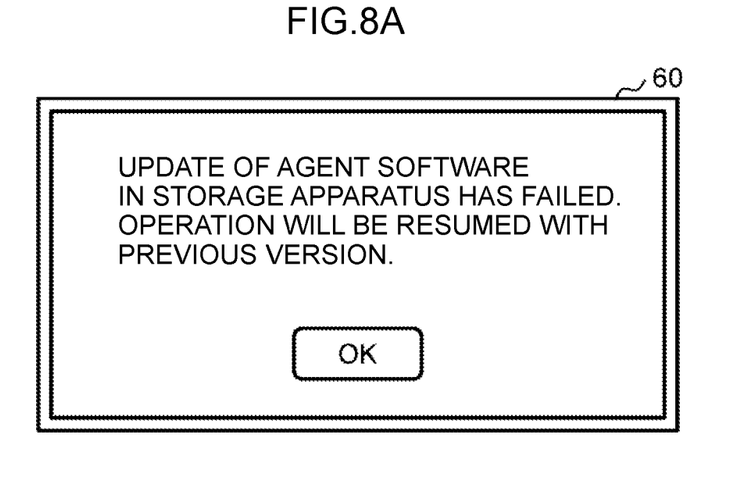
FIG. 8A and FIG. 8B are second configuration diagrams of image information processed by the public cloud server according to the embodiment.
Figure 8B:
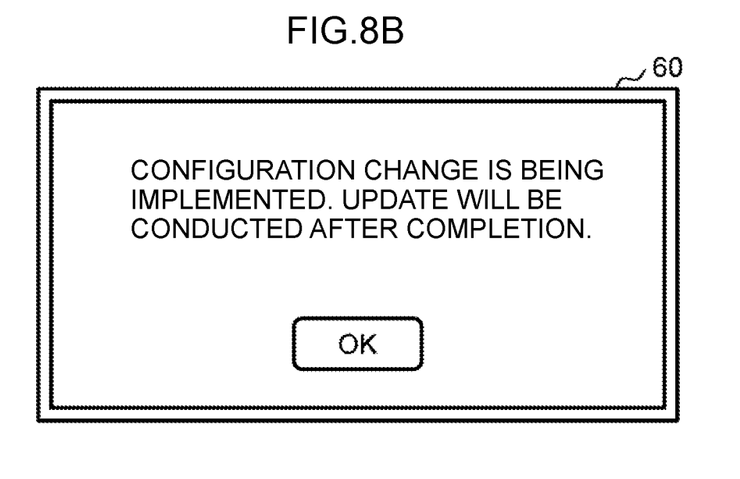

FIG. 8A and FIG. 8B are second configuration diagrams of image information processed by the public cloud server according to the embodiment. If the update of the agent software 55 managed by the storage apparatus 50 has failed, the storage management unit 16 for the public cloud server 10: generates image information indicating that "UPDATE OF AGENT SOFTWARE IN STORAGE APPARATUS HAS FAILED; OPERATION WILL BE RESUMED WITH PREVIOUS VERSION"; and transmits the generated image information to the client terminal 60 via the communication unit 15 and the Internet 70. Consequently, the information indicating that "UPDATE OF AGENT SOFTWARE IN STORAGE APPARATUS HAS FAILED; OPERATION WILL BE RESUMED WITH PREVIOUS VERSION" is displayed on the display screen of the client terminal 60 as illustrated in FIG. 8A.

Furthermore, if a configuration change is being implemented, the storage management unit 16: generates image information indicating that "CONFIGURATION CHANGE IS BEING IMPLEMENTED; UPDATE WILL BE CONDUCTED AFTER COMPLETION"; and transmits the generated image information to the client terminal 60 via the communication unit 15 and the Internet 70. Consequently, the information indicating that "CONFIGURATION CHANGE IS BEING IMPLEMENTED; UPDATE WILL BE CONDUCTED AFTER COMPLETION" is displayed on the display screen of the client terminal 60 as illustrated in FIG. 8B.

Figure 9:
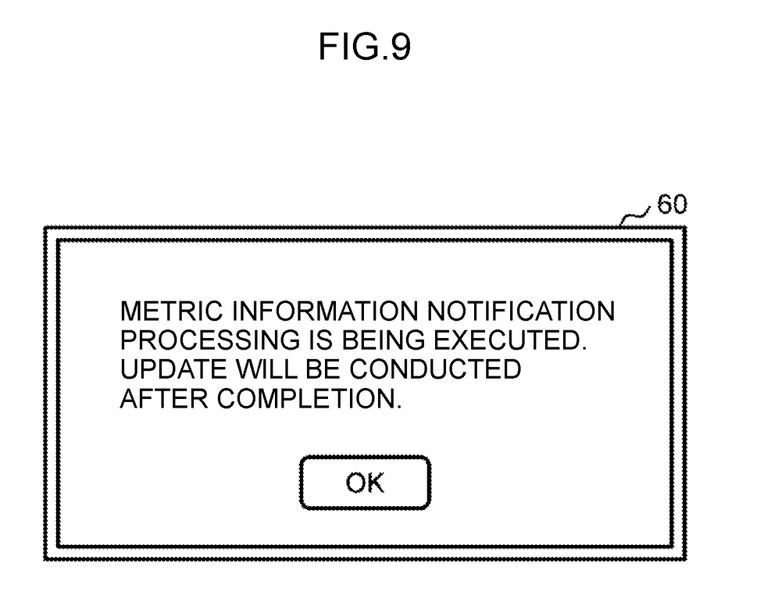
FIG. 9 is a third configuration diagram of image information processed by the public cloud server according to the embodiment.

FIG. 9 is a third configuration diagram of image information processed by the public cloud server according to the embodiment. When the storage management unit 16 for the public cloud server 10 is executing the metric information notification processing, the storage management unit 16: generates image information indicating that "METRIC INFORMATION NOTIFICATION PROCESSING IS BEING EXECUTED; UPDATE WILL BE CONDUCTED AFTER COMPLETION"; and transmits the generated image information to the client terminal 60 via the communication unit 15 and the Internet 70. Consequently, the information indicating that "METRIC INFORMATION NOTIFICATION PROCESSING IS BEING EXECUTED; UPDATE WILL BE CONDUCTED AFTER COMPLETION" is displayed on the display screen of the client terminal 60 as illustrated in FIG. 9.

In this embodiment, the public cloud server 10 which transmits/receives information to/from the storage apparatus 50 via the Internet 70 generates the configuration change information about the configuration change of the storage apparatus 50 (the information recorded in the configuration change operation management table 19) and the update information of the agent software 55 (the update program generated by the storage management unit 16) and transmits the configuration change information and the update information, which have been generated, to the storage apparatus 50.

When the storage apparatus 50 receives the configuration change information and the update information from the public cloud server 10, the central processing unit 51 which is the controller activates the agent software 55, monitors the status of the agent software 55 by, for example, monitoring the status of the agent software 55 along with the elapse of time, sequentially records the status of the agent software 55 in the status storing area 58 of the memory 53, and causes the agent software 55 to execute processing on condition that the status of the agent software 55 (the information recorded in the status storing area 58 of the memory 53) is standby. For example, the central processing unit 51 causes the agent software 55 to execute any one of the following processing: the configuration change processing for changing the configuration of the storage apparatus 50 on the basis of the configuration change information received from the public cloud server 10; the processing for notifying the public cloud server 10 of the metric information; and the update processing for updating the agent software 55 on the basis of the update information received from the public cloud server 10. Consequently, the central processing unit 51 can cause the agent software 55 to automatically execute any one of the processing for changing the configuration of the storage apparatus 50, the processing for notifying the public cloud server 10 of the metric information; and the processing for updating the agent software 55.

Under this circumstance, when the configuration change processing is being executed, when the metric information notification processing is being executed, or when it is assumed that the update processing will be completed at the same time or after the start of the metric information notification processing which is executed after the update processing, the central processing unit 51 can reliably cause the agent software 55 to automatically execute the processing for updating the agent software 55 by setting a time period for the update processing so that such time period does not overlap a time period for the configuration change processing or a time period for the metric information notification processing. Furthermore, by setting the time period for the update processing to be different from the time period for the metric information notification processing, the central processing unit 51 can transmit the metric information (the information including the configuration information, the performance information, and the capacity information of the storage apparatus 50) to the public cloud server 10 with certainty. Consequently, the public cloud server 10 can receive the metric information from the storage apparatus 50 without any loss of information.

When a plurality of pieces of agent software 55 of mutually different versions as the two or more pieces of agent software 55 are targeted as processing objects of the central processing unit 51, the central processing unit 51 can execute deployment processing on the agent software 55 of a version (the latest version) different from that of the agent software 55 which has already been deployed, without executing the processing for updating the agent software 55 which has already been deployed. Consequently, the storage apparatus 50 which is not permitted to stop operation can execute the deployment processing on the agent software 55 without stopping operation.

Furthermore, the central processing unit 51 can delete unnecessary agent software 55 by deleting the agent software 55 of a version(s) older than that of the agent software 55, on which the deployment processing has been executed, from among the agent software 55 which has already been deployed.

According to this embodiment, the agent software 55 can automatically execute any one of the processing for changing the configuration of the storage apparatus 50, the processing for notifying the public cloud server 10 of the metric information, and the processing for updating the agent software 55; and as a result, the processing of the agent software 55 which operates in the storage apparatus can be automated. Furthermore, according to this embodiment, the agent software 55 can automatically execute the update processing with certainty by setting the time period for the update processing so that such time period does not overlap the time period for the configuration change processing and the time period for the metric information notification processing.

(Variation)

When a plurality of pieces of agent software 55 of mutually different versions as the two or more pieces of agent software 55 are targeted as the processing objects of the central processing unit (controller) 51 during the configuration change processing or during the metric information notification processing, for example, if an affirmative judgment result is obtained in each of steps S8 and S9 in FIG. 4, the central processing unit (controller) 51 can, without returning to the processing in step S7: fetch the version information indicating the versions of the plurality of pieces of agent software 55 from the public cloud server 10; execute processing for determining the versions of the plurality of pieces of agent software 55 on the basis of the fetched version information; then continue the processing of the agent software 55 of an old version(s) from among the plurality of pieces of agent software 55; execute the deployment processing on the agent software 55 of a new version; and switch from the processing by the agent software (existing agent software) 55 of the old version to the processing by the agent software 55 of the new version after the completion of the configuration change processing or after the completion of the metric information notification processing, that is, when the status is standby. Consequently, the central processing unit 51 can execute the processing for updating the agent software 55 even during the configuration change processing or during the metric information notification processing.

Furthermore, if the central processing unit 51 is required to start the processing on the storage apparatus 50 during the processing for updating the agent software 55, the central processing unit 51 can suspend the processing for updating the agent software 55 and prioritize the processing on the storage apparatus 50. In this case, it is possible to reduce downtime during which the processing of the storage apparatus 50 is stopped.

Furthermore, when two systems are prepared as processing systems for two or more pieces of agent software 55, the central processing unit 51 can cause the agent software 55 of one system to execute the processing on the storage apparatus 50 and cause the agent software 55 of the other system to execute the processing for updating the agent software 55 of the other system. In this case, the processing on the storage apparatus 50 and the processing for updating the agent software 55 can be executed simultaneously.

Furthermore, it is also possible to adopt the configuration so that the agent software 55 is made to operate at a service processor (SVP) inside or outside the storage apparatus 50.

Incidentally, the present invention is not limited to the aforementioned embodiments, and includes various variations. For example, the aforementioned embodiments have been described in detail in order to explain the invention in an easily comprehensible manner and are not necessarily limited to those having all the configurations explained above. Furthermore, another configuration can be added to, deleted from, or replaced with part of the configuration of an embodiment.

Furthermore, part or all of the aforementioned respective configurations, functions, and so on may be realized by hardware by, for example, designing them in integrated circuits. Also, each of the aforementioned configurations, functions, and so on may be realized by software by processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

REFERENCE SIGNS LIST

1: storage system
10: public cloud server
11: central processing unit
12: storage device
13: input unit
14: output unit
15: communication unit
16: storage management unit
17: agent software
18: metric information management table
19: configuration change operation management table
50: storage apparatus
51: central processing unit
52: storage device
53: memory
54: communication unit
55: agent software
56: agent software version management table
57: agent software status management information
58: status storing area
60: client terminal
70: Internet
80: customer data center.

The invention claimed is:

1. A storage system, comprising:
a server and a storage apparatus for transmitting and receiving information to and from the server via a network,
wherein the storage apparatus includes:
a storage device which stores metric information including configuration information, performance information, and capacity information of the storage apparatus, and one or two or more pieces of agent software, a memory which stores a status of the agent software, and a controller for controlling the agent software,
wherein the controller:
activates the agent software and causes the agent software to execute:
processing for regularly transmitting an inquiry to the server via the network to check whether there is any update of the agent software;
processing for receiving update information of the agent software from the server via the network and storing the received update information in the storage device;
processing for acquiring the status of the agent software from the memory upon determining the status of the agent software indicates that the agent software is executing processing for changing a configuration of the storage apparatus or is executing processing for notifying the server of the metric information; and
processing for updating the agent software on the basis of the update information of the agent software, which is stored in the storage device, upon determining the status of the agent software indicates that the agent software is not executing processing for changing a configuration of the storage apparatus and is not executing processing for notifying the server of the metric information,
wherein when the two or more pieces of agent software are of mutually different versions, the controller fetches version information indicating the versions of the two or more pieces of agent software from the server during the configuration change processing or during the metric information notification processing, determines the versions of the two or more pieces of agent software on the basis of the fetched version information, causes agent software of an older version among the two or more pieces of agent software to continue executing the processing, causes agent software of a new version to execute deployment processing, and switches from the processing by the agent software of the older version to the processing by the agent software of the new version after completion of the configuration change processing or after completion of the metric information notification processing.

2. The storage system according to claim 1,
wherein the controller sets a time period for the update processing so that such time period does not overlap a time period for the configuration change processing and a time period for the metric information notification processing.

3. The storage system according to claim 2,
wherein when the two or more pieces of agent software are of mutually different versions, the controller causes agent software which has already been deployed to not execute the update processing and causes agent software of a version different from that of the agent software which has already been deployed, to execute deployment processing.

4. The storage system according to claim 3,
wherein the controller deletes agent software of a version which is older than that of the agent software on which the deployment processing has been executed, among the agent software which has already been deployed.

5. An information processing method by a storage system comprising a server and a storage apparatus for transmitting and receiving information to and from the server via a network, the storage apparatus including a storage device which stores metric information including configuration information, performance information, and capacity information of the storage apparatus, and one or two or more pieces of agent software, a memory which stores a status of the agent software, and a controller for controlling the agent software, the method comprising:
activating, by the controller, the agent software and causing the agent software to execute:
processing for regularly transmitting an inquiry to the sever via the network to check whether there is any update of the agent software;
processing for receiving update information of the agent software from the server via the network and storing the received update information in the storage device;
processing for acquiring the status of the agent software from the memory upon determining the status of the agent software indicates that the agent software is executing processing for changing a configuration of the storage apparatus or is executing processing for notifying the server of the metric information; and
processing for updating the agent software on the basis of the update information of the agent software, which is stored in the storage device, upon determining the status of the agent software indicates that the agent software is not executing processing for changing a configuration of the storage apparatus and is not executing processing for notifying the server of the metric information
wherein when the two or more pieces of agent software are of mutually different versions, the controller fetches version information indicating the versions of the two or more pieces of agent software from the server during the configuration change processing or during the metric information notification processing, determines the versions of the two or more pieces of agent software on the basis of the fetched version information, causes agent software of an older version among the two or more pieces of agent software to continue executing the processing, causes agent software of a new version to execute deployment processing, and switches from the processing by the agent software of the older version to the processing by the agent software of the new version after completion of the configuration change processing or after completion of the metric information notification processing.

6. The information processing method according to claim 5,
wherein the controller sets a time period for the update processing so that such time period does not overlap a time period for the configuration change processing and a time period for the metric information notification processing.

7. The information processing method according to claim 6,
wherein when the two or more pieces of agent software are of mutually different versions, the controller causes agent software which has already been deployed to not execute the update processing and causes agent software of a version different from that of the agent software which has already been deployed, to execute deployment processing.

8. The information processing method according to claim 7, wherein the controller deletes agent software of a version which is older than that of the agent software on which the deployment processing has been executed, among the agent software which has already been deployed.

* * * * *